(12) United States Patent
Nakamatsu et al.

(10) Patent No.: US 6,473,822 B1
(45) Date of Patent: Oct. 29, 2002

(54) DIGITAL SIGNAL PROCESSING APPARATUS

(75) Inventors: Akira Nakamatsu, Kanagawa; Takao Abe, Tokyo; Nobuo Nakamura, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/309,433

(22) Filed: May 11, 1999

(30) Foreign Application Priority Data

May 13, 1998 (JP) .......................................... 10-130885

(51) Int. Cl.[7] .............................................. G06F 13/00
(52) U.S. Cl. ....................... 710/300; 710/301; 345/503; 345/520
(58) Field of Search ................................ 710/305, 306, 710/63, 300, 301; 345/503, 520

(56) References Cited

U.S. PATENT DOCUMENTS 5,630,174 A * 5/1997 Stone, III et al. ............. 710/63
5,740,387 A * 4/1998 Lambrecht et al. ......... 710/129
5,812,800 A * 9/1998 Gulick et al. ............... 710/128

* cited by examiner

*Primary Examiner*—Peter Wong
*Assistant Examiner*—X. Chung-Trans
(74) *Attorney, Agent, or Firm*—Frommer Lawrence & Haug LLP; William S. Frommer; Gordon Kessler

(57) ABSTRACT

A digital signal processing apparatus for processing a plurality of video signals and a plurality of audio signals is provided, and comprises a computer comprising a system bus and a main CPU connected to the system bus and an extension processor comprising a plurality of signal processing circuits for processing the plurality of video signals and/or the plurality of audio signals, and a local CPU for controlling the plurality of signal processing circuits so as to allow for the processing of the video signals and audio signals in real time. The extension processor further comprises an extension system bus extended from the system bus, a digital audio video (DAV) bus for transmitting the plurality of video signals and the plurality of audio signals between the plurality of signal processing circuits and a local CPU bus for transmitting control signals outputted from the local CPU. Each processing circuit has a common interface which is capable of being connected to the extension system bus, the DAV bus and the local CPU bus in any position, thereby allowing for the processing of the video signals and audio signals regardless of the mounting positions of the processing circuits.

14 Claims, 10 Drawing Sheets

DIGITAL SIGNAL PROCESSING APPARATUS

FIELD OF THE INVENTION

The present invention relates generally to a digital signal processing apparatus for processing a digital video signal and a digital audio signal and, more particularly, to a digital signal processing apparatus including an expansion processing section for extending a system bus to which a computation means is connected.

BACKGROUND OF THE INVENTION

Computers (computation processing apparatuses) have been used as digital signal processing apparatuses for processing digital video signals and digital audio signals. That is, there is a tendency for computation apparatuses including computation means (CPU), input and output means, storage means, a system bus, and the like, and having the versatility to be able to perform a variety of tasks to be used as digital signal processing apparatuses.

However, when it is necessary to process video signals in real time, a conventional general-purpose computer may not necessarily be the most appropriate apparatus. The reason for this is that a general-purpose computer is not equipped with input and output means and real-time processing means dedicated solely to the processing of video signals. Thus, because of a resulting slow processing time, video signals may not be able to be processed in real time.

In order to remedy this situation, the following is conventionally performed. What is commonly referred to as an expansion slot is provided in the system bus of a computer, and a circuit board (expansion board) which enables the addition of various functions is mounted to this expansion slot. However, when complex processing is required as in a video editing operation, a plurality of circuit boards requiring a plurality of expansion slots are required. Problems may arise in the way the means for exchanging a video signal between boards is supplied.

Furthermore, in a conventional general-purpose computer, since the dimensions and method of mounting a board to an expansion slot are limited, a large circuit board having an unconventional size cannot be used, and high-speed transfer of data of video and audio signals is limited. It would therefore be beneficial to provide an improved digital signal processing apparatus that overcomes the drawbacks of the prior art.

OBJECTS OF THE INVENTION

It is therefore an object of the invention to provide an improved digital signal processing apparatus suitable for processing digital video and audio signals.

It is another object of the invention to provide an improved digital signal processing apparatus which is capable of increasing the number of expansion slots.

A further object of the invention is to provide an improved digital signal processing apparatus having a high degree of freedom in the size of circuit boards that can be mounted to expansion slots.

Still another object of the invention is to provide an improved digital signal processing apparatus that is capable of increasing the number of signal lines for video and audio signals and control signals.

Yet another object of the invention is to provide an improved digital signal processing apparatus having a high degree of freedom in the arrangement of circuit boards that can be mounted to expansion boards.

Still other objects and advantages of the invention will in part be obvious and will in part to apparent from the specification and the drawings.

SUMMARY OF THE INVENTION

Generally speaking, in accordance with the invention a system bus, computation means connected to the system bus, and a signal dedicated bus provided as a bus dedicated to video and audio signals which is adapted to be coupled with the system bus are provided.

The digital signal processing apparatus according to the invention preferably comprises an information processing section including a system bus to which computation means is connected; and an expansion processing section including a system bus for extending the above system bus, wherein the signal dedicated bus is provided within the expansion processing section. The expansion processing section is preferably provided with a power apparatus for the expansion processing section, and the power apparatus is controlled by the information processing section.

Furthermore, the signal dedicated bus preferably includes at least a video signal line, a video synchronization signal line, an audio signal line, and an audio synchronization signal line The video signal line of the signal dedicated bus preferably transmits video signals of a plurality of channels in parallel.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

BRIEF DESCRIPTION OF THE INVENTION

For a more complete understanding of the invention, reference is made to the following description and accompanying drawings, in which.

DETAILED DESCRIPTION OF THE PREFERRED EMBODIMENTS

The invention will now be described below with reference to the drawings.

Figure 1:
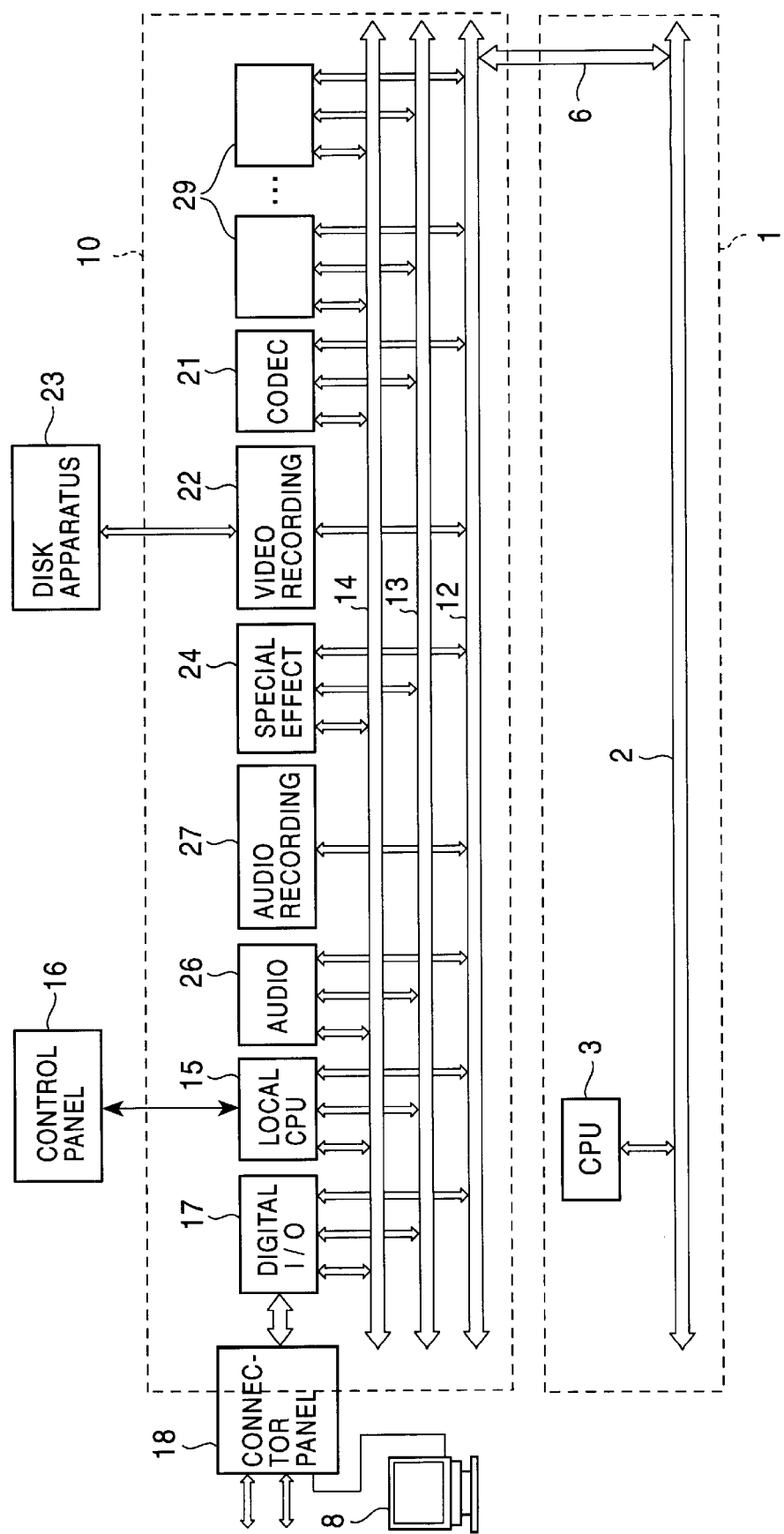
FIG. 1 depicts the construction of a digital signal processing apparatus according to a first embodiment of the invention.

FIG. 1 shows the construction of a digital signal processing apparatus according to a first embodiment of the invention.

A digital signal processing apparatus shown in FIG. 1 comprises an information processing apparatus 1, such as an ordinary personal computer or work station, and an expansion processing apparatus 10 for extending a system bus. Information processing apparatus 1 and expansion processing apparatus 10 are connected to each other via a bus connection board 6. That is, in information processing apparatus 1, a CPU 3, such as a microprocessor serving as computation means, is connected to an internal system bus 2, for example, forming a conventional personal computer. This internal system bus 2 is connected to an extended system bus 12 of expansion processing apparatus 10 via bus connection board 6 which effectively extends the system bus. A standard system bus 2 is used inside information processing apparatus 1. In this embodiment, what is commonly referred to as a PCI (peripheral component interconnect) bus is used, but the system bus is not limited thereto.

Extended system bus 12 positioned inside expansion processing apparatus 10 extends internal system bus 2 of information processing apparatus 1, and in this embodiment, an extended PCI bus is used. Inside expansion processing apparatus 10, a DAV (digital audio video) bus 13, which is a data bus dedicated to digital video and audio signals, and a local CPU bus 14 are provided parallel to extended system bus 12. Local CPU bus 14 is a control signal dedicated bus for transferring a control signal by a local CPU 15 positioned inside the expansion processing apparatus 10.

Figure 2:
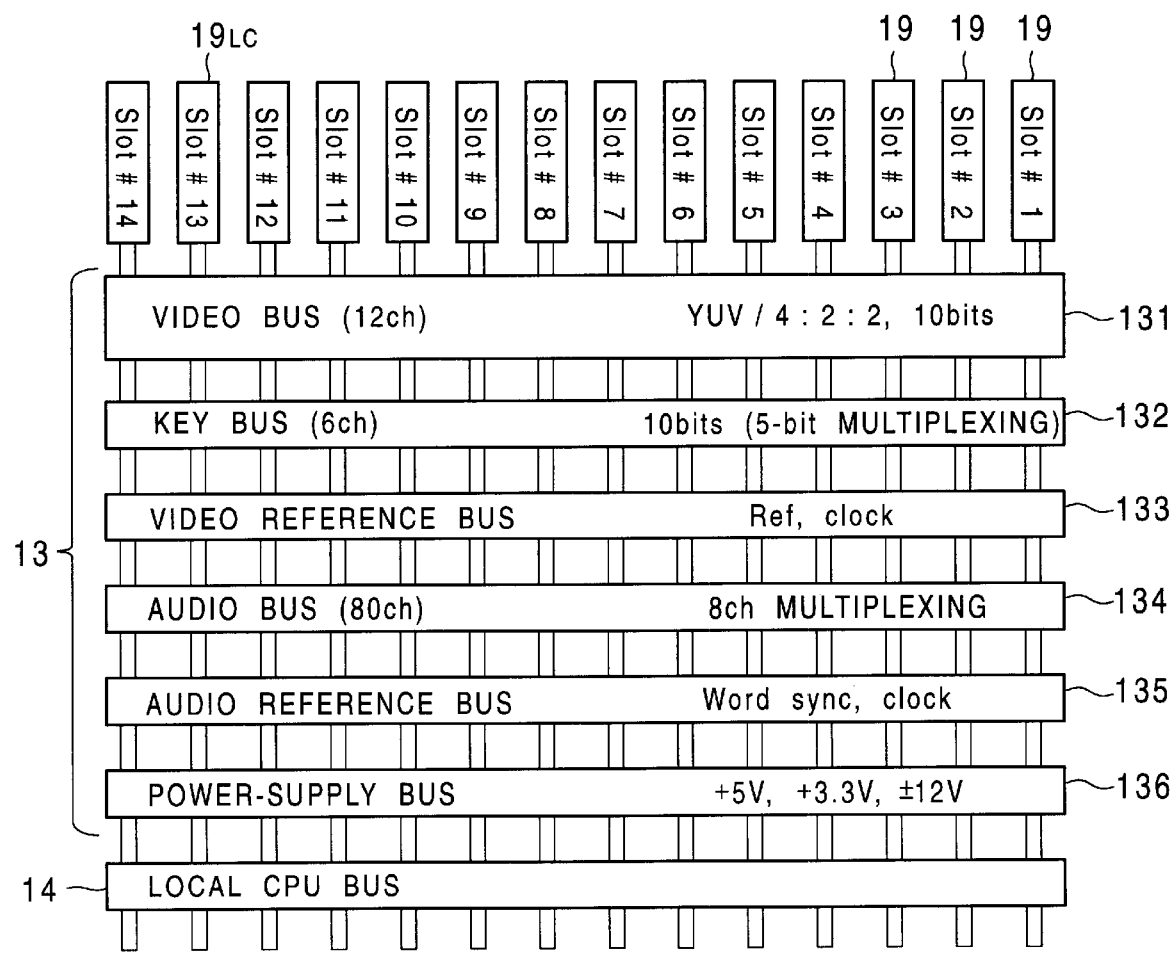
FIG. 2 depicts a digital audio video (DAV) bus and a local CPU bus inside an expansion processing apparatus according to the first embodiment of the invention.

DAV bus 13, which is a video and audio signal dedicated bus, has a construction such as that shown, for example, in FIG. 2. In FIG. 2, DAV bus 13 comprises a video (Video) bus 131, a key (Key) bus 132, a video reference (Video Ref) bus 133, an audio (Audio) bus 134, an audio reference (Audio Ref.) bus 135, and a power (Power) bus 136. Video bus 131, which is a bus dedicated to a digital video signal, is formed of, for example, 120 signal lines. If 10 bits of each digital signal having YUV of 4:2:2 are multiplexed with a luminance signal (Y) and color difference signal (U,V) 12 channels can be obtained. Key bus 132, which is a bus dedicated to a key signals corresponding to the video signals of 12 channels respectively, is formed of, for example, 30 signal lines. If 10 bits of each key signal are multiplexed in groups of 5 bits, 6 channels can be obtained. Video reference bus 133 sends a video clock signal and a synchronization signal. Audio bus 134, which is a bus dedicated to a digital audio signal, is formed of, for example, 10 signal lines. If 8 channels are multiplexed for each line, 80 channels can be obtained. Audio reference bus 135 sends an audio clock signal and a synchronization signal. Power bus 136 supplies power required for each slot for connection of a circuit board provided in the bus.

Local CPU bus 14 is a control bus used by local CPU 15, which is a controlling computation apparatus, and is provided for allowing control with respect to the circuit on the circuit board mounted in each slot in expansion processing apparatus 10. This control would be very difficult to perform via the system bus.

More specifically, in video signals and audio signals, what is commonly referred to as "real-time processing" is often required to maintain continuity of the time of the signals. When the above-mentioned PCI bus is used as a system bus, for channels for digital video signals, only about one channel can be secured in a conventional system. Furthermore, in order to edit video signals of two or more channels as in what is commonly referred to as "A-B roll editing", processing is required in which digital video signal data is stored temporarily, for example, in a large-capacity memory and is read at a necessary time, making the construction complex, and not allowing real-time processing to be performed in a conventional apparatus.

For this reason, in accordance with the invention, a DAV bus is provided within expansion processing apparatus 10 that is capable of handling digital video signals and audio signals of a plurality of channels in a parallel manner. Further, in order to realize real-time processing of a plurality of channels, various types of video signal processing circuit boards and audio signal processing circuit boards may be mounted via the DAV bus. In order to control real-time processing in these video and audio signal processing circuits, the local CPU and local CPU bus are provided. As a result, it is possible to specify any desired transmission channel within a plurality of channels and send digital signal data from an expansion board, such as a CODEC circuit board for coding/decoding processing, a recording medium interface circuit board, and so on. It is also possible to receive digital signal data of any desired channel, to freely change the configuration of data transmission, and to perform digital signal processing of a plurality of channels in real time.

Slots 19 for electrically connecting and mechanically supporting one or more circuit boards are provided coupled with respect to the extended system bus 12, the DAV bus 13, and the local CPU bus 14 as desired inside the expansion processing apparatus 10 in FIGS. 1 and 2. Generally speaking, a slot refers to a connector for mounting an expansion board to a system bus and electrically connecting them. In this embodiment, slots 19 of expansion processing apparatus 10 are equivalent to a set of connectors, which will be described later, provided in each of buses 12, 13, and 14. That is, one expansion board (circuit board) is mounted to one slot 19, and thereby electrical connection is made with respect to this expansion board via each connector of each of the buses 12, 13, and 14 as desired. Depending upon the actual configuration of each a expansion board, electrical connection with all of the buses 12, 13, and 14 is not necessarily required.

In this first embodiment, for example, 14 slots are provided inside expansion processing apparatus 10, making it possible to mount a maximum of 14 expansion boards. For example, in as shown in FIG. 1, as such an expansion board, there are shown a local CPU circuit board 15, a digital I/O circuit board 17, a CODEC circuit board 21 for coding/decoding video signals, an interface circuit board 23 for video recording, a special-effects circuit board 24 for performing video signal processing, such as a digital special effect or switcher, a circuit board 26 for audio signal processing (coding/decoding, etc.), an interface circuit board 27 for audio recording, and another circuit board 29. Local CPU circuit board 15 is connected to a control panel 16. Digital I/O circuit board 17 is connected to a control panel 18. Video recording information circuit board 24 is connected to a disk apparatus 23, such as what is commonly referred to as a "RAID" (redundant array of inexpensive disks), or another information storage medium. An input and output of an information signal (digital AV signal, etc.) is made with an external apparatus via control panel 18, and, for example, a monitor apparatus 8 is connected thereto.

Slots 19 of FIG. 2 are assigned Slot #1 to Slot #14 as slot numbers. Local CPU circuit board 15 of FIG. 1 is mounted to the 13th (Slot #13) slot 19$_{LC}$, and this fixed position of the local CPU is set so as to become a supply source for a clock signal, as will be described later.

Figure 3:
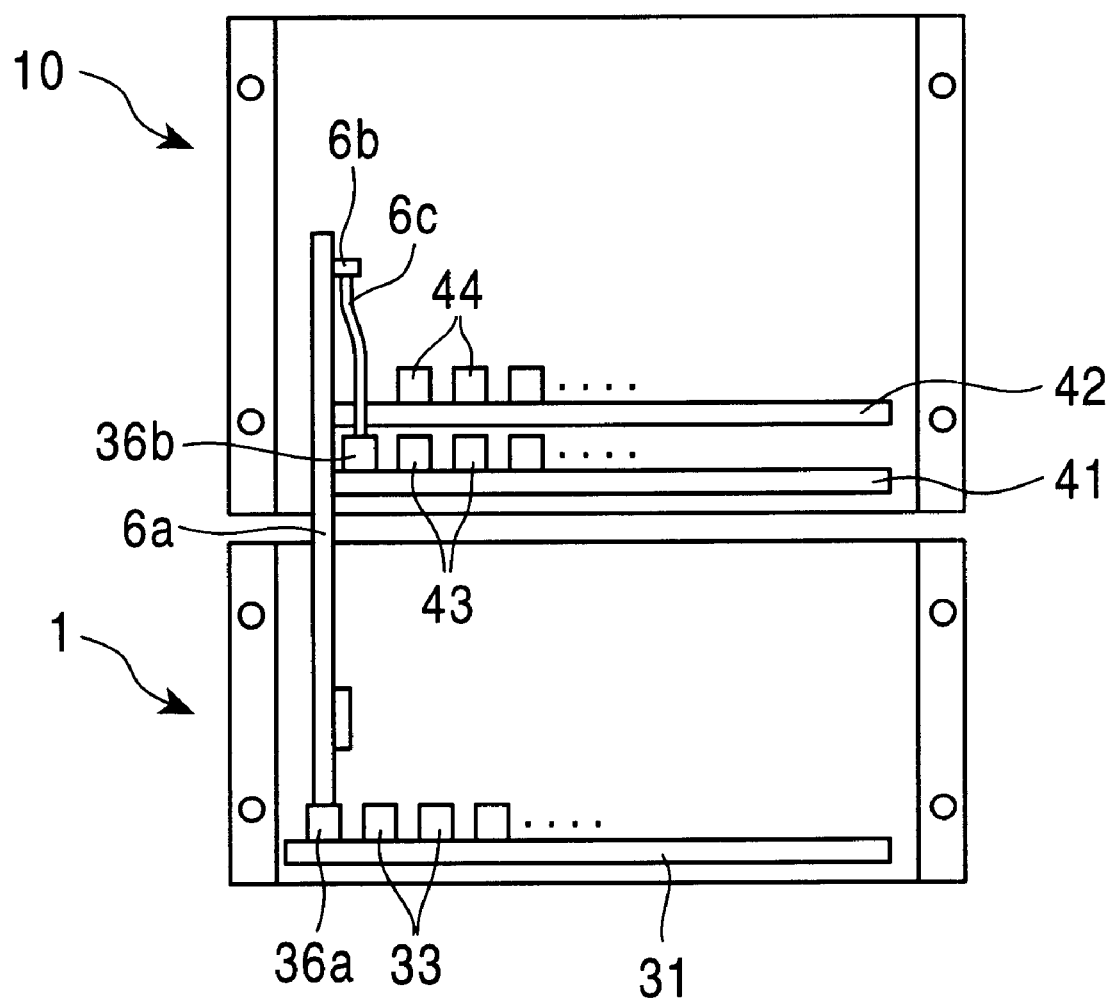
FIG. 3 depicts the connection between an information processing apparatus and an expansion processing apparatus of the digital signal processing apparatus according to the first embodiment of the invention.
Figure 4:
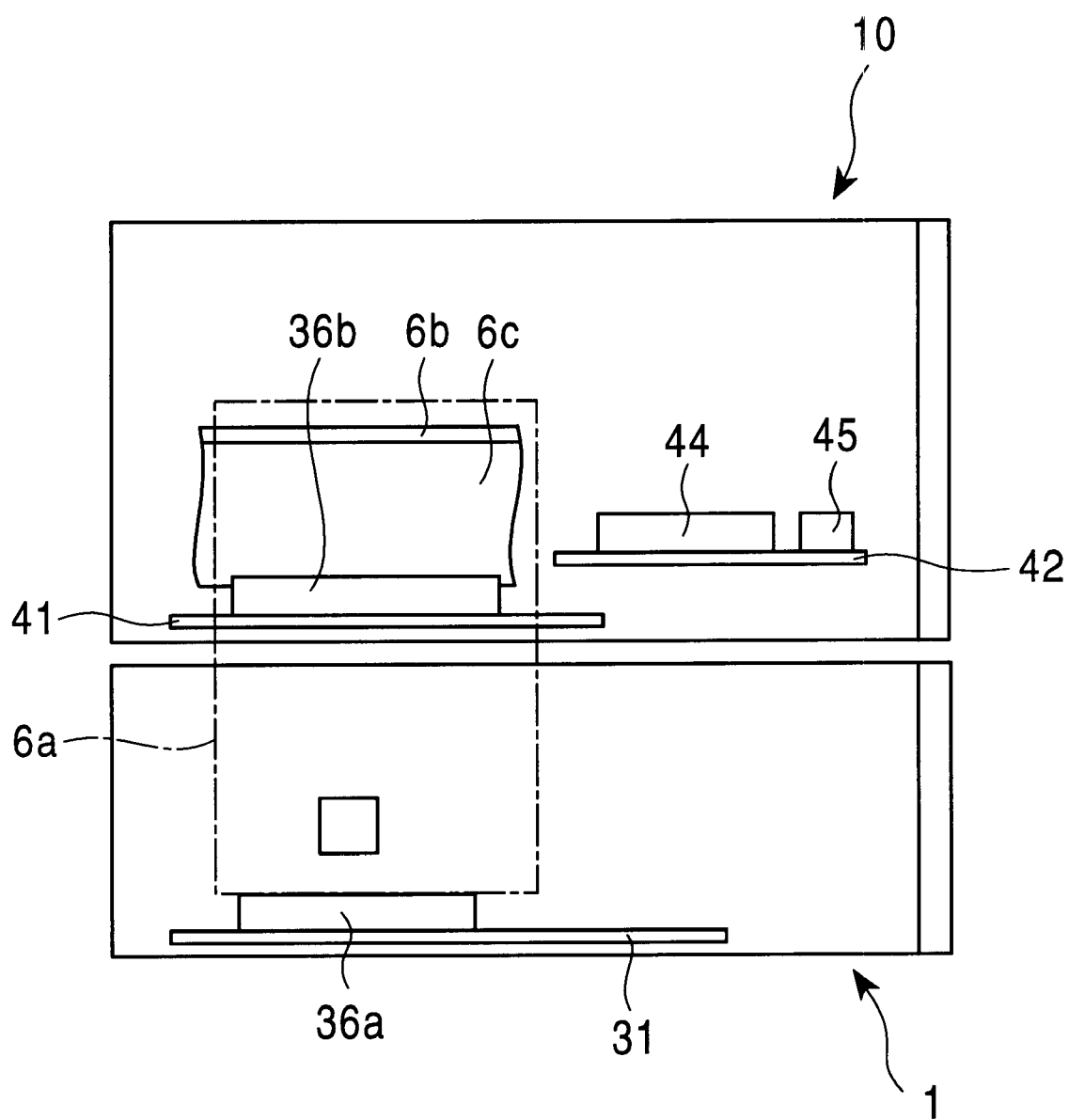
FIG. 4 depicts the connection between the information processing apparatus and the expansion processing apparatus of the digital signal processing apparatus according to the first embodiment of the invention from a different aspect than that of FIG. 3.

FIGS. 3 and 4 schematically depict the mechanical construction of a digital signal processing apparatus comprising information processing apparatus 1, bus connection board 6, and expansion processing apparatus 10 from aspects 90° from each other. In these FIGS. 3 and 4, system bus 2 is provided on a bus board 31 of information processing apparatus 1, usually with a computation processing circuit (CPU), such as a microprocessor, being mounted thereon as well. Bus board 31 is also referred to as a "motherboard" or a "backplane board", and in this embodiment, what is commonly referred to as a PCI motherboard is used. Bus board 31 is provided with a plurality of connectors 33 as expansion slots for mounting expansion boards (circuit boards), such as various PCI boards, connected to the system bus.

Bus board 31 is also provided with a connector 36a for extending the system bus, with a bus extension board 6a being mounted to connector 36a, which acts as bus connection board 6 for extending the system bus. Information processing apparatus 1 and expansion processing apparatus 10 are positioned in such a manner as to be stacked one on top of the other, and bus extension board 6a is disposed perpendicularly with respect to bus board 31 of information processing apparatus 1 in such a manner as to pass through to the inside of information processing apparatus 1 and expansion processing apparatus 10. On expansion processing apparatus 10 side, a flat cable 6c is connected to bus extension board 6a via a cable connection section 6b, and is connected by a connector 36b of a bus board 41 inside expansion processing apparatus 10, providing electrical connection between extended system bus 12 on the bus board 41 and bus extension board 6a. This in turn allows for electrical connection between system bus 2 of information processing apparatus 1 and extended system bus 12 of expansion processing apparatus 10 to be performed.

Two bus boards (what is commonly referred to as "motherboards" or "backplane boards") 41 and 42 are disposed inside expansion processing apparatus 10, with extended system bus 12 being provided on bus board 41, and DAV bus 13 and local CPU bus 14 being provided on bus board 42. A plurality of connectors 43 for connecting an expansion board (circuit board) to extended system bus 12 are provided on bus board 41. A plurality of connectors 44 for connection with DAV bus 13 and a plurality of connectors 45 (FIG. 4) for connection with local CPU bus 14 are provided on bus board 42 in such a manner as to correspond to these connectors 43, respectively. These connectors 43, 44, and 45 correspond to slots 19 of FIG. 2, and a set of connectors 43, 44, and 45 are arranged so as to be aligned in a straight line with respect to each slot 19. For example, in this embodiment, 14 sets of connectors are provided in such a manner as to correspond to the 14 slots depicted in FIG. 2.

In accordance with the invention a vertical (up and down) stepped height difference between bus boards 41 and 42 is provided. These bus boards 41 and 42 are disposed so that parts thereof overlap each other. This is for overcoming different placement levels of connectors of the expansion board and for increasing the effective area of the boards. Of course, the bus boards 41 and 42 may be combined into one board, or positioned in an alternative relative configuration.

As shown in FIGS. 3 and 4, the reason a construction is adopted in which the bus extension board 6a is used so as to pass through the inside of the information processing apparatus 1 and the expansion processing apparatus 10 is that the extension distance of the system bus, such as a PCI bus, is minimized, and unwanted electromagnetic radiation is minimized. In the example of FIGS. 3 and 4, a construction is adopted in which flexible flat cable 6c is connected to bus extension board 6a, thus making it possible to overcome and positional deviation which occurs when apparatuses 1 and 10 are connected.

Figure 5:
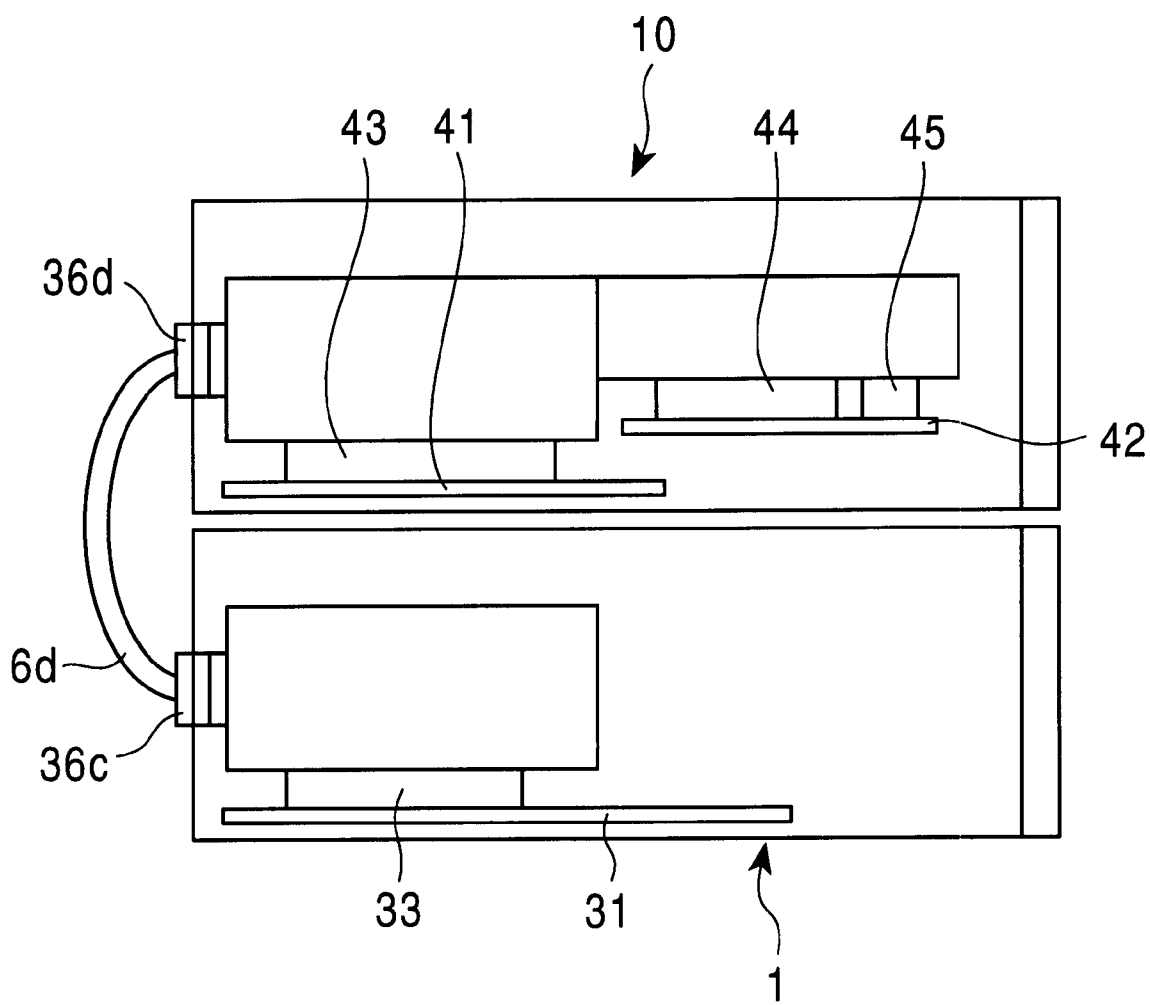
FIG. 5 depicts the connection between the information processing apparatus and the expansion processing apparatus of the digital signal processing apparatus according to a second embodiment of the invention.

When the limitation of the above-mentioned unwanted electromagnetic radiation and the demand for shortening the extension distance are not very stringent, as shown in FIG. 5, an alternative construction may be adopted in which a section between a connector 36c provided in information processing apparatus 1 and a connector 36d provided in the information processing apparatus 10 is connected via a connection cable 6d.

Since the connectors 43 on bus. board 41 of expansion processing apparatus 10 and connectors 44 and 45 on bus board 42 are arrayed in line, it is possible to use an expansion circuit board (expansion board) which is designed to be used for a special application. For example, for specialized for processing of digital audio and audio signals while maintaining compatibility with a system bus, such as a PCI bus.

Figure 6:
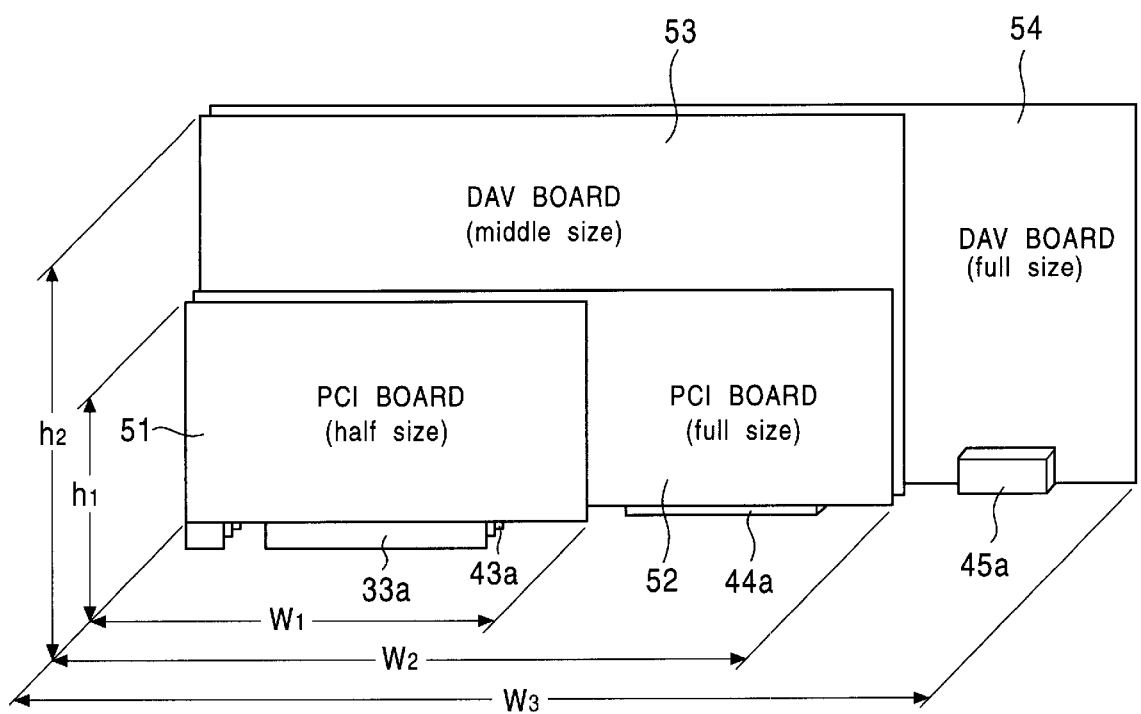
FIG. 6 depicts a specific example of plurality of expansion circuit boards (expansion boards)

FIG. 6 shows some examples of expansion circuit boards (expansion boards) that can be mounted on the expansion processing apparatus 10 and be used. As shown in FIG. 6, PCI boards 51 and 52 are circuit boards which include a connector 33a for connection to the PCI bus and which are also used as an expansion board of an ordinary computer system. The respective specific dimensions of the height h1 and the width w1 of a half-size PCI board 51 and the height h1 and the width w2 of a full-size PCI board are, for example, h1=98.4 mm, w1=174.6 mm, and w2=312 mm. In contrast, as an expansion circuit board (expansion board) dedicated to expansion processing apparatus 10, a middle-size DAV board 53 of a height h2 and a width w2, and a full-size DAV board 54 of a height h2 and a width w3 may also be provided. Specific examples of the dimensions of each section are h2=221.7 mm and w3=470 mm, and w2 is set to 312 mm in a manner similar to that described above. The middle-size DAV board 53 is a board which includes a connector 43a for connection to the PCI bus (the extended main bus 12) in a manner similar to the PCI boards 51 and 52 which are used normally, which further includes a connector 44a for connection to DAV bus 13, and which is expanded in the height direction. The full-size DAV board 54 is a board such that the middle-size DAV board 53 is expanded in a lateral direction, which includes a connector for connection to the PCI bus, a connector for connection to the DAV bus 13 and a further connector 45a for connection to local CPU bus 14 and which uses software of local CPU 15. It is a matter of course that as long as the prescriptions about the type and position of each connector are followed, the shape and dimensions of the circuit board may be changed as desired.

Figure 7:
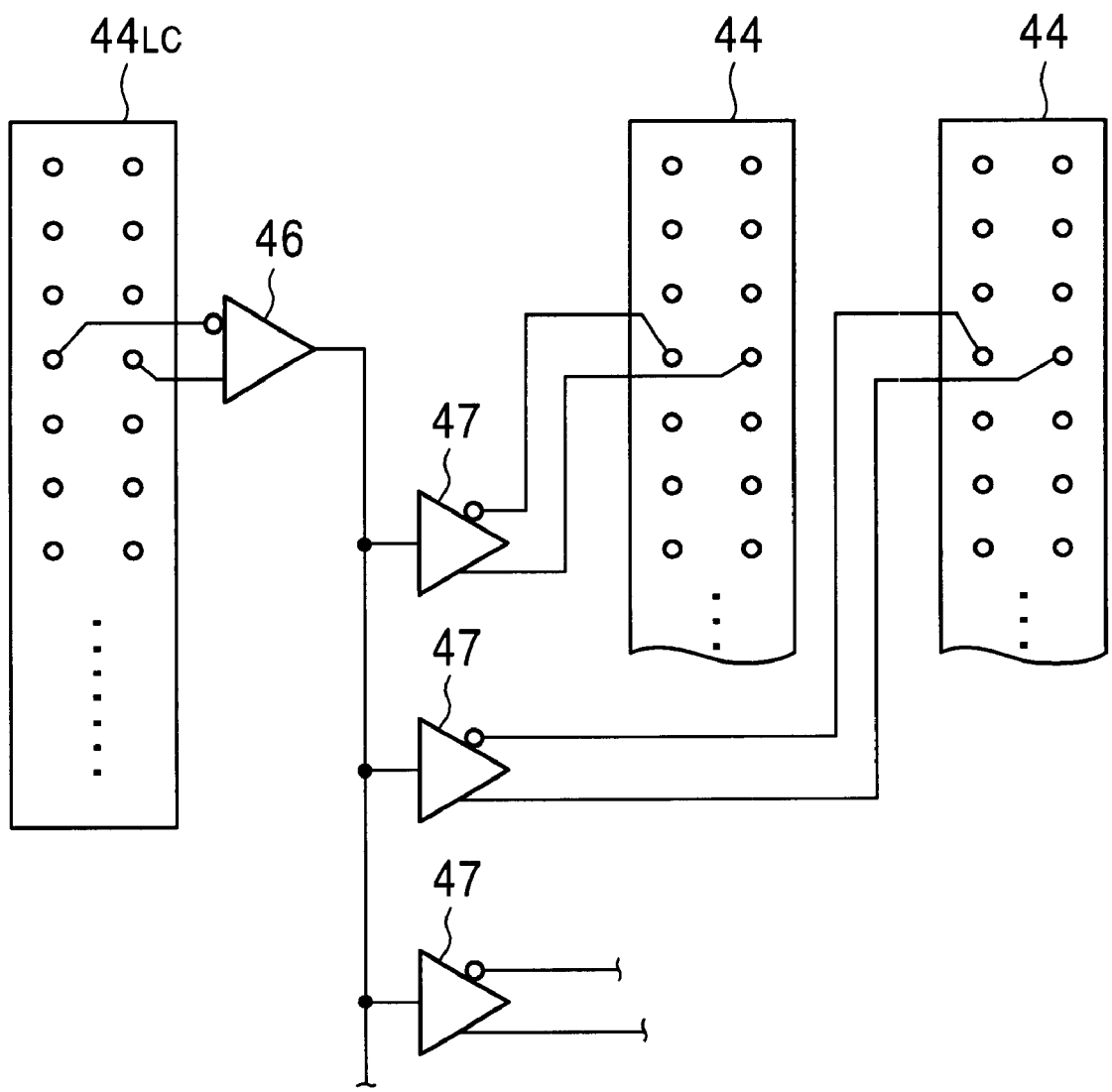
FIG. 7 illustrates a specific example of clock supply.

Next, referring to FIG. 7, a description is given of a method for supplying a video clock signal sent from a video reference bus 133 of DAV bus 13 of FIG. 2, and an audio clock signal sent from an audio reference bus 135. As shown in FIG. 7, connectors 44 for DAV bus 13 provided on bus board 42 are shown. Local CPU circuit board 15 of FIG. 1 is mounted to a predetermined connector $44_{LC}$ among these connectors 44. This connector $44_{LC}$ corresponds to the 13th (Slot #13) slot $19_{LC}$ of FIG. 2.

Clock signals for video and audio from local CPU circuit board 15 connected to connector $44_{LC}$ are supplied to a differential input amplifier 46 of a clock driver circuit on bus board 42 via a predetermined terminal (for example, the 10th and 11th pins). An output from this differential input amplifier 46 is sent to a plurality (corresponding to the number of other slots in bus board 42) of differential output amplifiers 47 whereby the output is converted into a differential signal, and the differential clock output signals from these differential output amplifiers 47 are supplied to predetermined terminals (for example, the 10th and 11th pins) of the connectors 44 of the other slots, respectively.

Figure 8:
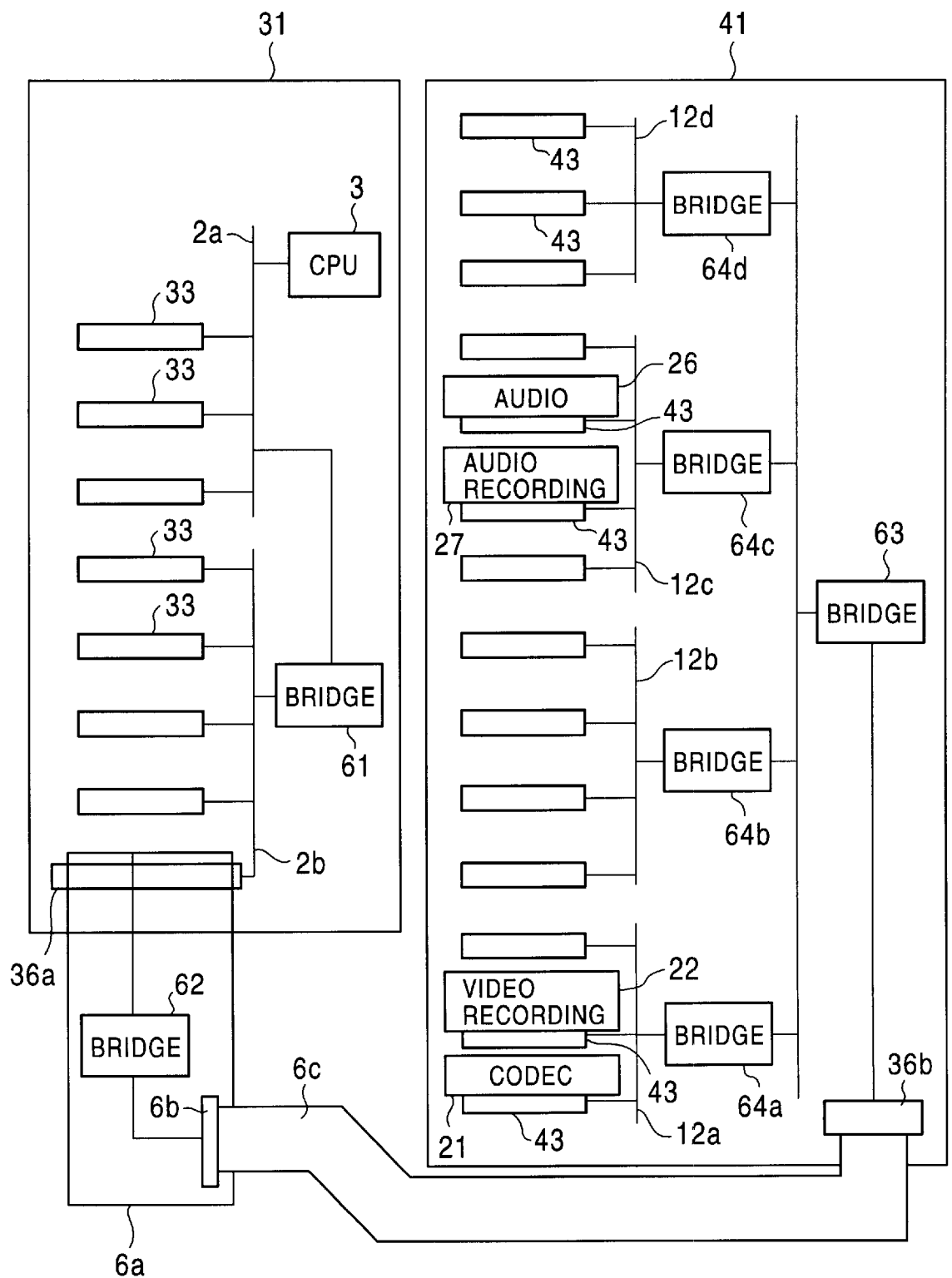
FIG. 8 depicts a construction in which a system bus is connected via a bridge in accordance with the invention.

In DAV bus 13, while each slot is equivalent for the signal within the bus, it is required that each slot operate synchronously very strictly. Therefore, a specific slot (Slot #13) is determined as a clock supply source, and a clock signal from this slot is distributed to the other clocks. In addition, a construction in which an output from one differential input amplifier 46 is supplied to the respective slots via the differential output amplifiers 47 for the number of the other slots has the advantage that, in comparison with a construction in which one clock supply line is connected to each slot and a clock signal is supplied in sequence, since resistance to noise is strong because of a differential signal and one-to-one supply is provided, the influence of noise is small and sufficient supply current can be secured, and variations of the phase of a clock signal received by each slot are very small. Furthermore, this configuration has the advantage that since the clock driver circuit is provided on a bus board, and signal pins are at the same position for each slot, the side which outputs a clock signal and the side which receives the clock signal need not take into account one-to-one supply. In order to control real-time processing of video signals and audio signals, such as those described above, in synchronization with such a reference clock, the local CPU of local CPU circuit board 15 and local CPU bus 14 are provided. When expansion slot is provided in the system bus, since fan-out is limited, the number of slots must be increased via a bridge. The fan-out of one bridge is, for example, four. In order to provide 14 expansion slots as in this embodiment of the invention, four bridge ICs are required. FIG. 8 shows an expansion construction of expansion slots of a system bus, in which such a bridge is used. As is shown in FIG. 8, for system bus 2 of bus board 31 on the information processing apparatus 1 side, for example, three expansion slots (corresponding to the connectors 33) are provided in a system bus 2a to which a chip set, such as the CPU 3, is connected. System bus 2a is connected to a system bus 2b via a bridge circuit 61. System bus 2b is provided with four expansion slots (connectors 33) and connector 36a for the extension of the system bus. Bus extension board 6a is inserted and mounted to the connector 36a. System bus 2b is connected to a bridge circuit 62 on bus extension board 6a and is inserted and connected to connector 36b of the bus board 41 on the expansion processing apparatus 10 side, thereby connecting bridge circuit 62 to a bridge circuit 63 on the bus board 41. Four bridge circuits 64a, 64b, 64c, and 64d are each connected to this bridge circuit 63, and the extended system buses 12a, 12b, 12c, and 12d are connected to the bridge circuits 64a, 64b, 64c, and 64d, respectively.

In the embodiment of the invention depicted in FIG. 8, a circuit board requiring DMA (Direct Memory Access) transfer is mounted to a group of expansion slots belonging to the same bridge circuit so that DMA transfer is performed within the system bus connected to the same bridge circuit. That is, since this DMA transfer is often performed between a digital signal coding/decoding circuit and an interface circuit for a storage medium for the digital signal, a CODEC circuit board 21 for coding/decoding a video signal, and an interface circuit board 22 for video recording are inserted and mounted to the connectors 43 of the system bus 12a connected to a bridge circuit 64a so that DMA transfer is performed between these boards 21 and 22. Furthermore, a circuit board 26 for signal processing, such as coding/decoding an audio signal, and an interface circuit board 27 for audio recording are inserted and mounted to the connectors 43 of the system bus 12c connected to a bridge circuit 64c so that DMA transfer is performed between these circuit boards 26 and 27.

As described, by allowing DMA transfer to be performed within the system bus connected to the same bridge circuit, passage through the bridge circuit is not required during DMA transfer. Therefore, a delay (for example, 270 ns) due to passage through the bridge circuit does not occur, making it possible to perform data transfer at a high speed and with high efficiency.

In addition, as depicted in FIG. 8, by connecting the bridge circuits 64a to 64d directly to the bridge circuit 63 so that the bridge circuits 64a to 64d are in parallel with each other, it is possible to shorten the delay time due to passage through the bridge circuit in comparison with a construction in which the bridge circuits 64a to 64d are sequentially connected in series.

The delay time in a section from system bus 2a to which the chip set, such as the CPU 3, on the bus board 31 of the information processing apparatus 1 is connected, up to system buses 12a to 12d to which bridge circuits 64a to 64d are connected, respectively, corresponds to an amount for four bridge circuits, and when the delay time of one bridge circuit is, for example, 270 ns, in the case of four bridge circuits, the delay time (latency) becomes 1080 ns.

Figure 9:
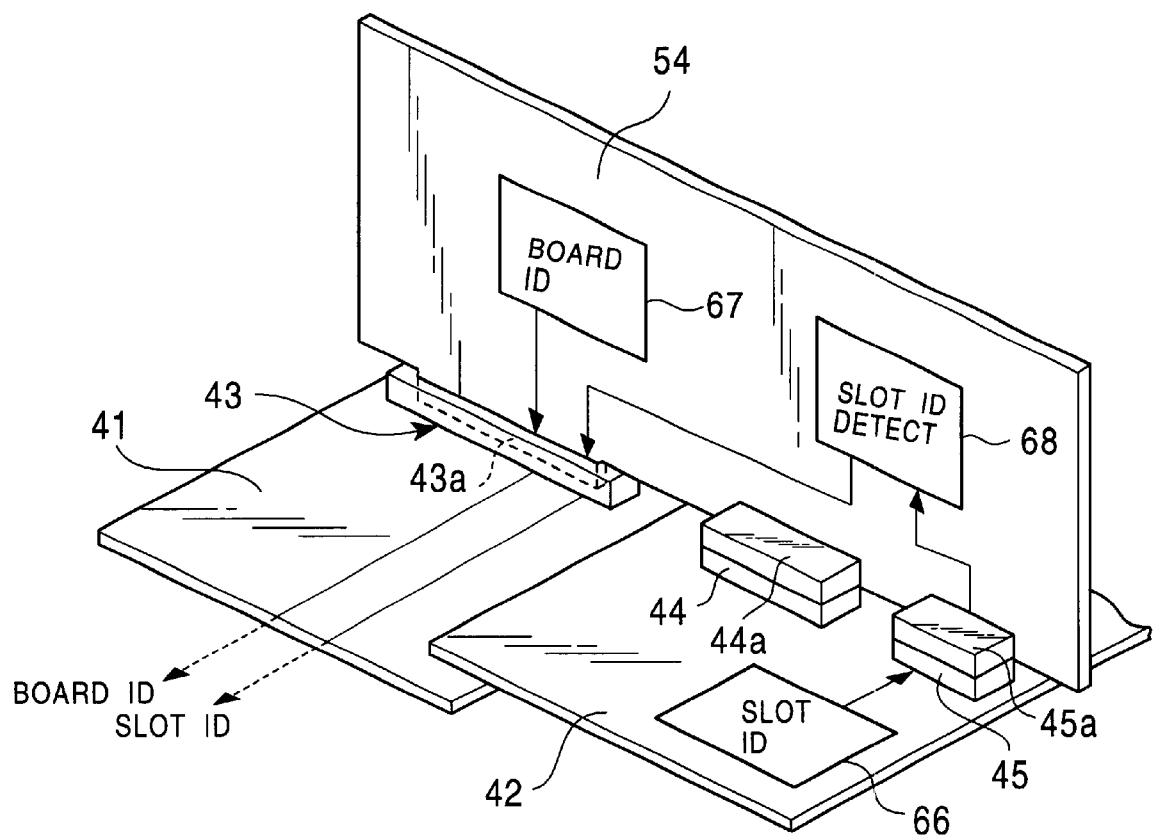
FIG. 9 depicts a board ID and a slot ID.

In order to confirm whether or not a set of circuit boards in which DMA transfer is performed has been inserted and mounted to a group of expansion slots connected to the same bridge circuit, the respective identification information for the expansion slots and the circuit boards is obtained. More specifically, as shown in FIG. 9, a slot ID circuit 66 for providing identification information which is characteristic (unique) of the applicable slot which can be distinguished from the other slots is provided for each slot of bus boards 41 and 42 on the expansion processing apparatus 10 side. A board ID circuit 67 which outputs identification information which is characteristic of each board is provided on each expansion circuit board (expansion board) 54.

In the example of FIG. 9, slot ID circuit 66 is provided on the bus board 42 and connected to a predetermined pin of connector 45, and is read by slot ID detect circuit 68 on expansion board 54 via a connector 45a of expansion board (circuit board) 54. Alternatively, slot ID circuit 66 may be connected to connector 44, or slot ID circuit 66 may be provided on the bus board 41 and connected to connector 43. In slot ID circuit 66, for example, a resistor is connected to the terminal pin of a connector, and the other end of this resistor is grounded or a predetermined electrical potential is given thereto, thereby representing "0" or "1". The construction may be formed in such a way that such resistors are provided for the number of bits required for slot identification, for example, four corresponding to the four bits for identification of 14 slots (#1~#14) in this embodiment, and the value of the four bits of the slot ID circuit 66 may be made different for each slot. The slot ID detect circuit 68 may be formed of hardware, but instead, identification may be made by software by using a CPU on expansion board 54, or the like. Information of the slot ID identified by the slot ID detect circuit 68 on the expansion board 54 is sent to the CPU 3, via the system buses 12 and 2.

Board ID circuit 67 on expansion board 54 is connected to connector 43a of expansion board and connector 43a is inserted and mounted to connector 43 of the bus board 41, thereby being connected to extended system bus 12. Board identification information sent to system buses 12 and 2 is read by CPU3 of information processing apparatus 1 of FIG. 1, and mounted expansion board is identified. A ROM may be used as board ID circuit 67, for example. Identification of the board may be made by local CPU 15 on expansion processing apparatus 10 of FIG. 1, for example, by connecting board ID circuit 67 to the connector 44a or connector 45a. In this manner, CPU 3 receives the slot ID information and the board ID information from each expansion board 54, and is able to determine whether or not the expansion board in which predetermined signal processing is performed has been inserted and mounted to a particular expansion slot, and to know a position of the expansion slot in which the expansion board is mounted. Thus, expansion boards can be mounted in any slot. No predefined configuration is required.

Next, a method for controlling the power source is described. As shown in FIGS. 1 and 3 discussed above, the digital signal processing apparatus of this embodiment is composed of two units, information processing apparatus 1 and expansion processing apparatus 10, these being mechanically and electrically coupled to each other. It is a common practice that if the scale of a circuit is increased, each of the apparatuses is provided with its own power circuit. When the power is switched on, a sequence in which the power sources are sequentially switched on in these the apparatuses 1 and 10 must be obeyed. For this reason, in this embodiment, a control signal is sent from one power apparatus to another power apparatus.

Figure 10:
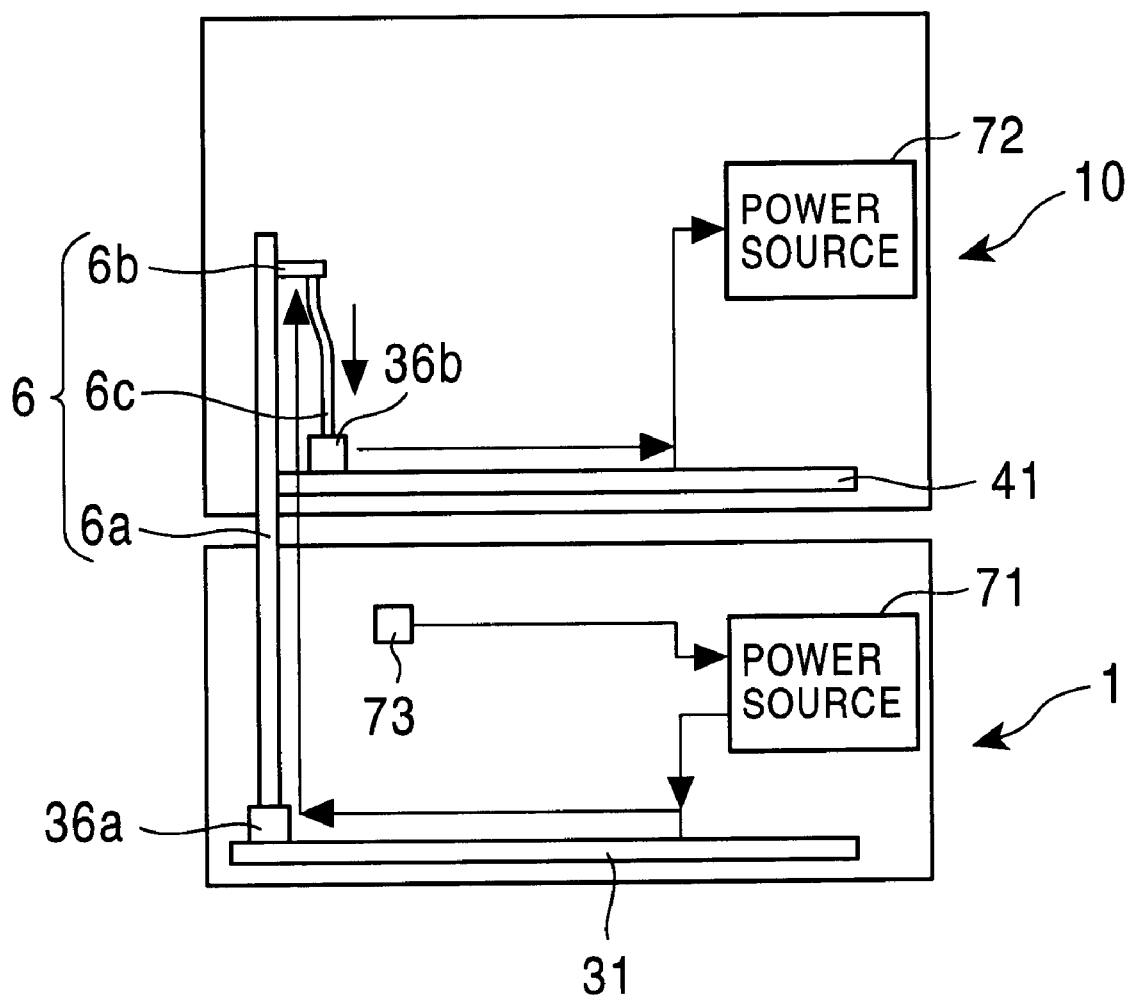
FIG. 10 depicts power on/off control.

More specifically, as is shown in FIG. 10, separately from a power apparatus 71 in information processing apparatus 1, a power apparatus 72 dedicated to expansion processing apparatus 10 is provided. In FIG. 10, power apparatus 71 in information processing apparatus 1 must be started earlier than the power apparatus 72 in expansion processing apparatus 10. Therefore, the power on/off signal from a power switch 73 is transmitted to power apparatus 71, and the power control signal output from power apparatus 71 is input to power apparatus 72 for the expansion processing apparatus via bus board 31, via bus connection section 6 (bus extension board 6a, cable connection section 6b, and flat cable 6c) and connector 36b from connector 36a, and via bus board 41 of the extended system bus, thereby controlling on/off of power apparatus 72.

In the manner as described above, since the power apparatus 72 in the expansion processing apparatus 10 is controlled by the power apparatus 71 of information processing apparatus 1, control is performed such that after power apparatus 71 starts, power apparatus 72 starts by following the sequence of system reset.

The present invention is not limited to the above-described embodiment, and may be formed into a construction in which, for example, an information processing apparatus and an expansion processing apparatus are formed into one unit and are housed within one housing. It is a matter of course that the specific construction of the DAV bus, the construction of the bus board, and the like are also not limited to the examples shown in the figures.

In accordance with the invention, a system bus is provided, computation means are connected to the system bus, and a signal dedicated bus is provided as a bus dedicated to video and audio signals with respect to the system, it is possible to increase the number of channels for video and audio data and the number of control signals, making it possible to perform processing, such as an editing operation for video and audio signals, in real time.

Since the construction is formed in such a way that a plurality of expansion slots are provided in a system bus which is connected to a system bus of an information processing section so as to extend the system bus, it is possible to greatly increase the number of expansion slots, and the degree of freedom in the outer shape of the board on the expansion side is increased, making possible mounting of various types of circuit boards. Furthermore, since the extended system bus and the signal dedicated bus are provided in parallel to each other, it is possible to reliably insert and mount an expansion circuit board with a high reliability of connection. Furthermore, since the bus board of the system bus and the bus board of the signal dedicated bus are disposed separately in such a way that parts thereof overlap with each other with a stepped difference, it is possible to overcome the different placement levels of the connectors of the expansion circuit boards and to increase the effective area of the bus boards. Furthermore, because each expansion slot and expansion board contain identification information, each expansion board can be positioned in any expansion slot. No preconfiguration is required.

In addition, because the power ori/off control of the power apparatus on the expansion processing apparatus side is performed in accordance with a control signal from the power apparatus of the information processing apparatus side, normal switching on of the power can be performed reliably by obeying the reset sequence of the circuit sections, and high reliability during starting can be realized.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood the following claims are intended to cover all of the generic and specific features of the invention herein described and all statements of the scope of the invention which, as a matter of language, might be said to fall therebetween.

What is claimed is:

1. A digital signal processing apparatus for processing a plurality of video signals and a plurality of audio signals, comprising:

a computer comprising a system bus and a main CPU connected to said system bus;

an extension processor comprising a plurality of signal processing circuits mounted thereon, each for processing one or more of said plurality of video signals and said plurality of audio signals, and a local CPU for controlling said plurality of signal processing circuits so as to allow for the processing of said video signals and audio signals in real time, said extension processor being selectively coupleable to said system bus;

wherein said extension processor further comprises an extension system bus extended from said system bus and selectively coupleable therewith, a digital audio video (DAV) bus for transmitting said plurality of video signals and said plurality of audio signals between said plurality of signal processing circuits and a local CPU bus for transmitting control signals outputted from said local CPU; and wherein each signal processing circuit has a common interface means connectable to said extension system bus, said DAV bus and said local CPU bus of said signal processing circuits in any mounting position of said extension processor, thereby allowing for the processing of said video signals and audio signals regardless of the mounting positions of said signal processing circuits on said extension processor.

2. The digital signal processing apparatus according to claim 1, wherein said extension processor is adapted to receive and to allow processing circuits to be removed therefrom without changing the system configuration of said extension system bus, said DAV bus or said local CPU bus.

3. The digital signal processing apparatus according to claim 2, wherein said DAV bus comprises a video bus for transmitting said plurality of video signals, a video reference bus for transmitting a reference clock signal for synchronizing said plurality of video signals transmitted via said video bus, a key bus for transmitting a plurality of key signals corresponding to said plurality of video signals, an audio bus for transmitting said plurality of audio signals and an audio reference bus for transmitting a reference clock for synchronizing said plurality of audio signals transmitted via said audio bus.

4. The digital signal processing apparatus according to claim 3, wherein one of said plurality of signal processing circuits comprises a reference clock supply means for supplying a reference clock to said plurality of signal processing circuits via said video reference bus and said audio reference bus.

5. The digital signal processing apparatus according to claim 3, wherein said plurality of signal processing circuits are provided on a plurality of extension boards, respectively.

6. The digital signal processing apparatus according to claim 5, wherein said extension boards comprise at least a first extension board having an interface connector connected to said extension system bus, a second extension board having interface connectors connected to said extension system bus and said DAV bus, and a third extension board having interface connectors connected to said extension system bus, said DAV bus and local CPU bus.

7. The digital signal processing apparatus according to claim 5, further comprising:

a motherboard having a plurality of slots for mounting said plurality of extension boards thereon and for interfacing between said signal processing circuits provided on said extension boards and said extension bus, said DAV bus and said local CPU bus, each provided on said motherboard.

8. The digital signal processing apparatus according to claim 7, wherein said main CPU detects a board ID information of said extension board mounted on said motherboard and a slot ID information of said slot in which said extension board is mounted, and said main CPU controls said signal processing circuits provided on said extension board based on said slot ID information and said board ID information.

9. The digital signal processing apparatus according to claim 1, wherein said extension processor is adapted to increase the number of said processing circuits without changing the system configuration of said extension system bus, said DAV bus and said local CPU bus.

10. The digital signal processing apparatus of claim 1, further comprising a bus extension board for selectively coupling said extension processor with said system bus.

11. The digital signal processing apparatus of claim 10, wherein said bus extension board is positioned to minimize the extension distance of said system bus, and to minimize the generation of electromagnetic radiation.

12. The digital signal processing apparatus of claim 10, wherein said bus extension board is positioned to minimize the extension distance of said system bus, and to minimize the generation of electromagnetic radiation.

13. A digital signal processing apparatus for processing a plurality of video signals and a plurality of audio signals, comprising:

a computer comprising a system bus and a main CPU connected to said system bus;

an extension processor comprising an extension system bus extending from said system bus, said extension processor being selectively coupleable with said system bus, a plurality of signal processing circuits, each for processing one or more of said plurality of video signals and said plurality of audio signals, and a digital audio video (DAV) bus for transmitting said plurality of video signals and said plurality of audio signals between said plurality of signal processing circuits so as to allow for the processing of said video signals and audio signals in real time;

wherein said extension processor is adapted to allow for a change in the configuration of the positioning of said processing circuits without changing the system configuration of said extension system bus or said DAV bus.

14. The digital signal processing apparatus of claim 13, further comprising a bus extension board for selectively coupling said extension processor with said system bus.

* * * * *